US011681983B2

(12) United States Patent
Leonardo et al.

(10) Patent No.: US 11,681,983 B2
(45) Date of Patent: Jun. 20, 2023

(54) SYSTEMS AND METHODS FOR PRIORITIZING PICK JOBS WHILE OPTIMIZING EFFICIENCY

(71) Applicant: 6 River Systems, LLC, Waltham, MA (US)

(72) Inventors: Christopher Leonardo, Waltham, MA (US); Ellen Patridge, Somerville, MA (US); Félix Alberto Rodríguez Falcón, Somerville, MA (US)

(73) Assignee: 6 RIVER SYSTEMS, LLC, Waltham, MA (US)

( * ) Notice: Subject to any disclaimer, the term of this patent is extended or adjusted under 35 U.S.C. 154(b) by 0 days.

(21) Appl. No.: 17/383,437

(22) Filed: Jul. 23, 2021

(65) Prior Publication Data
US 2023/0022085 A1    Jan. 26, 2023

(51) Int. Cl.
*G06Q 10/087*    (2023.01)
*G08G 1/09*    (2006.01)
(Continued)

(52) U.S. Cl.
CPC ......... *G06Q 10/087* (2013.01); *G05D 1/0221* (2013.01); *G06Q 10/06311* (2013.01); *G08G 1/093* (2013.01)

(58) Field of Classification Search
CPC ........... G06Q 10/087; G06Q 10/06311; G05D 1/0221; G08G 1/093
See application file for complete search history.

(56) References Cited

U.S. PATENT DOCUMENTS 7,509,671 B1 *   3/2009   Bedell ................... G06Q 10/06
                                                                    718/103
8,892,241 B2   11/2014   Weiss
(Continued)

FOREIGN PATENT DOCUMENTS

JP       2022-509762 A      1/2022
WO       2019217420 A1     11/2019
WO       2020257389 A1     12/2020

OTHER PUBLICATIONS

Scholza, André; Schuberta, Daniel; Wäscher, Gerhard; European Journal of Operational Research; Order picking with multiple pickers and due dates—Simultaneous solution of Order Batching, Batch Assignment and Sequencing, and Picker Routing Problems; vol. 263, Issue 2, Dec. 1, 2017, (Year: 2017).*

(Continued)

*Primary Examiner* — Michael Jared Walker
(74) *Attorney, Agent, or Firm* — Hanley, Flight & Zimmerman, LLC

(57) ABSTRACT

Systems and methods for dynamically reprioritizing pick jobs in a fulfillment center are described herein. The example systems can be configured to periodically classify pick jobs in order to optimize throughput of the fulfillment center. The classifying can include determining an estimated completion time for pick jobs and identifying at-risk jobs that may complete after their associated due dates. The at-risk jobs can be assigned to autonomous vehicles based primarily on their associated due dates. Other pick jobs that are not at-risk can be assigned to autonomous vehicles based primarily on efficiency. The at-risk pick jobs can be assigned to autonomous vehicles before the other pick jobs.

25 Claims, 10 Drawing Sheets

(51) Int. Cl.
*G05D 1/02* (2020.01)
*G06Q 10/0631* (2023.01)

(56) References Cited

U.S. PATENT DOCUMENTS

| | | | |
|---|---|---|---|
| 9,834,380 B2 | 12/2017 | Hamilton et al. | |
| 10,089,586 B2* | 10/2018 | Vestal | G05D 1/0274 |
| 10,220,705 B2 | 3/2019 | Ramanujam | |
| 10,241,644 B2* | 3/2019 | Gruber | G06F 3/04842 |
| 10,513,033 B2* | 12/2019 | Johnson | G06Q 10/063 |
| 10,814,489 B1* | 10/2020 | Kalouche | B25J 19/04 |
| 2012/0078673 A1* | 3/2012 | Koke | G06Q 10/06311 |
| | | | 705/26.81 |
| 2014/0136255 A1* | 5/2014 | Grabovski | G06Q 10/063114 |
| | | | 705/7.14 |
| 2014/0365258 A1 | 12/2014 | Vestal et al. | |
| 2015/0266672 A1* | 9/2015 | Lert | B65G 1/0492 |
| | | | 700/214 |
| 2018/0158020 A1* | 6/2018 | Khasis | G01C 21/343 |
| 2019/0217478 A1* | 7/2019 | Johnson | G06Q 10/06398 |
| 2019/0275676 A1* | 9/2019 | Jensen | B25J 13/006 |
| 2020/0160242 A1* | 5/2020 | Johnson | G06Q 10/06311 |
| 2020/0180874 A1* | 6/2020 | Mattern | B65G 47/52 |
| 2020/0302391 A1 | 9/2020 | Li et al. | |
| 2020/0310391 A1 | 10/2020 | Cole et al. | |
| 2020/0342419 A1 | 10/2020 | Zatta et al. | |
| 2020/0342420 A1 | 10/2020 | Zatta et al. | |
| 2022/0155781 A1* | 5/2022 | Cacioppo | G05D 1/0217 |
| 2022/0397404 A1 | 12/2022 | Franey et al. | |
| 2022/0397912 A1 | 12/2022 | Franey et al. | |

OTHER PUBLICATIONS

Pages 461-478, https://www.sciencedirect.com/science/article/pii/S03772217173038557via%3Dihub (Year: 2017).*

* cited by examiner

350

| Time right now: | 15:30 |
| --- | --- |
| # of Chucks: | 1 Chuck |
| Tolerance: | 100% |

| Pick Job | Score | # of Line Items | Due Date | Pick Rate | Est. Completion | Risk Indicator |
| --- | --- | --- | --- | --- | --- | --- |
| 1 | 3 | 5 | 16:00 | 60 lines / hr | 15:35 | R |
| 2 | 7 | 10 | 16:00 | | 15:45 | R |
| 3 | 4 | 20 | 16:00 | | 16:05 | R |
| 4 | 6 | 10 | 16:00 | | 16:15 | R |
| 5 | 3 | 5 | 18:00 | | 16:20 | |
| 6 | 2 | 2 | 19:00 | | 16:22 | |

^ note the sort by due date

^ Calculated for each job independently – sort within a particular due date could be relatively random Idea is that once one of the jobs within a due date is at risk, the entire due date is marked as at risk

FIG. 3A

Consider Order X due at 5 pm. It's 12 pm now.
You are running at 100 lines per hour.
Fulfillment Center A
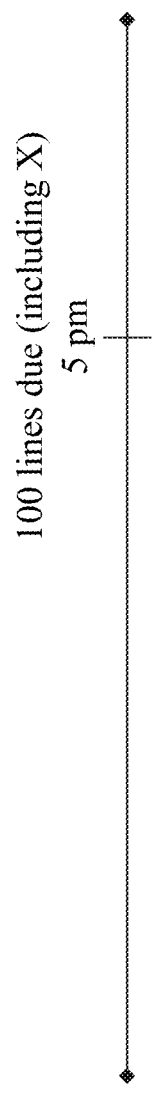
Fulfillment Center B
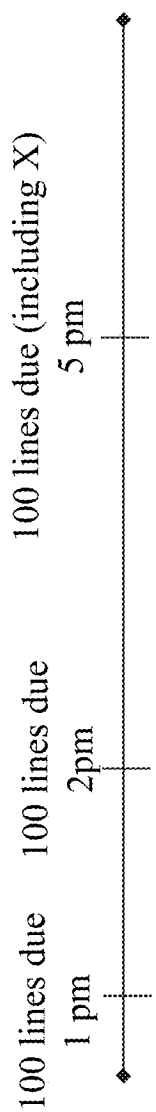
Fulfillment Center C
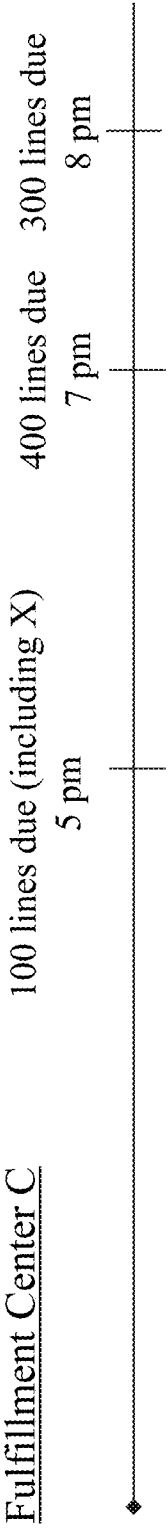
FIG. 7

SYSTEMS AND METHODS FOR PRIORITIZING PICK JOBS WHILE OPTIMIZING EFFICIENCY

TECHNICAL FIELD

Embodiments of the technology relate generally to systems and methods for dynamically prioritizing pick jobs in an order fulfillment environment while optimizing efficiency.

BACKGROUND

Commerce is increasingly supported by complex systems of order fulfillment. The increase in electronic commerce, including on-line purchases and mail orders, has added to the complexity of order fulfillment. In order to efficiently and rapidly supply purchased items to purchasers, fulfillment management systems operated at fulfillment centers are used to optimize the gathering and shipping of items to purchasers. Fulfillment management systems can coordinate the work of human pickers and/or autonomous vehicles in the gathering of items for shipping.

SUMMARY

In one example embodiment, the present disclosure is directed to a method of assigning pick jobs to autonomous vehicles. The method can comprise, for a plurality of pending pick jobs, at least some of the pick jobs of the plurality of pending pick jobs having associated due dates, periodically classifying the pick jobs. The classifying can include: determining an estimated completion time for the pick jobs of the plurality of pick jobs, and comparing associated due dates of the pick jobs to the estimated completion time to identify any at-risk pick jobs that may complete after the associated due dates, wherein the at-risk pick jobs, if any, are to be assigned in an order based primarily on the associated due dates, and wherein others of the pick jobs are to be assigned in an order intended primarily to maximize overall efficiency of picking. The method can further comprise assigning the pick jobs to the autonomous vehicles, wherein when assigning the pick jobs, the autonomous vehicles are assigned the at-risk jobs in order, if any, before the others of the pick jobs are assigned.

Example embodiments of the foregoing method can include one or more of the following features. The at-risk pick jobs can be ordered primarily based on the associated due dates and secondarily to maximize overall efficiency of the picking. The at-risk pick jobs can be further ordered by applying an additional ship date bias to the at-risk pick jobs when the estimated completion time exceeds the associated due dates by a predetermined factor. The others of the pick jobs can be ordered for efficiency based at least on locations of items to be picked in the pick jobs.

In another example of the foregoing method, the method can comprise periodically determining a pick rate for a fulfillment center, wherein the pick rate is based at least in part on pick rate data, and wherein the estimated completion time is determined by applying the pick rate to a schedule of pick jobs of the plurality of pick jobs. The pick rate can be selected from a schedule of pick rates, wherein each pick rate of the schedule of pick rates is associated with a time interval. Additionally, the pick rate for the fulfillment center can be further based on one or more of: a number of available workers; a number of available autonomous vehicles; a buffer; and a standard deviation for the pick rate data.

In yet another example of the foregoing method, the periodic classification of the pick jobs can occur at a defined interval. In another example, the periodic classification of the pick jobs can occur responsive to receiving new data for a fulfillment center. In another example, the classifying can further include: ordering the at-risk pick jobs according to the order based primarily on the associated due dates; and ordering the others of the pick jobs according to the order intended primarily to maximize overall efficiency of the picking.

In yet another example, the at-risk pick jobs can be placed in a priority work queue ordered primarily based on the associated due dates and the others of the pick jobs can be assigned to a second work queue ordered primarily to maximize overall efficiency of the picking. In another example, placing a given pick job in the priority work queue can include associating the given pick job with a priority indicator. In another example, the priority work queue can correspond to a first in-memory data structure representing a first collection of pick jobs and the second work queue can correspond to a second in-memory data structure representing a second collection of pick jobs. In another example, at least one of the first in-memory data structure and the second in-memory data structure is a priority queue. Alternatively, in yet another example, a single data structure can comprise the priority work queue as well as the second work queue.

In yet another example, the at-risk pick jobs and the others of the pick jobs can be ordered based in part on an associated score, wherein the associated score can be based on one or more of the following associated with the at-risk pick jobs and the others of the pick jobs: a number of items; a location of items; and the associated due date.

In another example embodiment, the present disclosure is directed to a computing system for assigning pick jobs to autonomous vehicles. The computing system can include a communication device configured to communicate with the autonomous vehicles, and at least one processor in communication with the communication device. The at least one processor can be configured to, for a plurality of pending pick jobs, at least some of the pick jobs of the plurality of pending pick jobs having associated due dates, periodically classifying the pick jobs. The classifying can include: determining an estimated completion time for the pick jobs of the plurality of pick jobs, and comparing associated due dates of the pick jobs to the estimated completion time to identify any at-risk pick jobs that may complete after the associated due dates, wherein the at-risk pick jobs, if any, are to be assigned in an order based primarily on the associated due dates, and wherein others of the pick jobs are to be assigned in an order intended primarily to maximize overall efficiency of picking. The processor can be further configured to assign the pick jobs to the autonomous vehicles, wherein when assigning the pick jobs, the autonomous vehicles are assigned the at-risk jobs in order, if any, before the others of the pick jobs are assigned, and wherein the communication device can be configured to communicate the pick jobs to the autonomous vehicles.

Example embodiments of the foregoing computing system can include one or more of the following features. The at-risk pick jobs can be ordered primarily based on the associated due dates and secondarily to maximize overall efficiency of the picking. The at-risk pick jobs can be further ordered by applying an additional ship date bias to the at-risk pick jobs when the estimated completion time exceeds the associated due dates by a predetermined factor. The others of the pick jobs can be ordered for efficiency based at least on locations of items to be picked in the pick jobs. In alternative example embodiments, both the at-risk pick jobs and the others of the pick jobs can be assigned a ship date bias.

In another example of the foregoing computing system, the processor can be further configured to periodically determine a pick rate for a fulfillment center, wherein the pick rate is based at least in part on pick rate data, and wherein the estimated completion time is determined by applying the pick rate to a schedule of pick jobs of the plurality of pick jobs. In yet another example, the pick rate can be selected from a schedule of pick rates, wherein each pick rate of the schedule of pick rates is associated with a time interval. In yet another example, the pick rate for the fulfillment center can be further based on one or more of: a number of available workers; a number of available autonomous vehicles; a buffer; and a standard deviation for the pick rate data.

In yet another example of the foregoing computing system the at-risk pick jobs can be placed in a priority work queue ordered primarily based on the associated due dates and the others of the pick jobs can be assigned to a second work queue ordered primarily to maximize overall efficiency of the picking. In yet another example, the priority work queue can correspond to a first in-memory data structure representing a first collection of pick jobs and the second work queue can correspond to a second in-memory data structure representing a second collection of pick jobs.

In another example embodiment, the present disclosure is directed to a non-transitory computer-readable medium having instructions stored thereon that, when executed by one or more computer processors, cause the computer processors to perform operations. The operations can comprise, for a plurality of pending pick jobs, at least some of the pick jobs of the plurality of pending pick jobs having associated due dates, periodically classifying the pick jobs. The classifying can include: determining an estimated completion time for the pick jobs of the plurality of pick jobs, and comparing associated due dates of the pick jobs to the estimated completion time to identify any at-risk pick jobs that may complete after the associated due dates, wherein the at-risk pick jobs, if any, are to be assigned in an order based primarily on the associated due dates, and wherein others of the pick jobs are to be assigned in an order intended primarily to maximize overall efficiency of picking. The method can further comprise assigning the pick jobs to a plurality of autonomous vehicles, wherein when assigning the pick jobs, the autonomous vehicles are assigned the at-risk jobs in order, if any, before the others of the pick jobs are assigned.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of the disclosed systems and methods and therefore are not to be considered limiting of the scope of this disclosure. The principles illustrated in the example embodiments of the drawings can be applied to alternate systems and methods. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

FIG. 3A is an illustration of a data structure in accordance with an example embodiment of the disclosure.

FIG. 7 is an illustration applying the classifying and ordering techniques to fulfillment centers in accordance with an example embodiment of the disclosure.

DETAILED DESCRIPTION OF EXAMPLE EMBODIMENTS

Figure 1A:
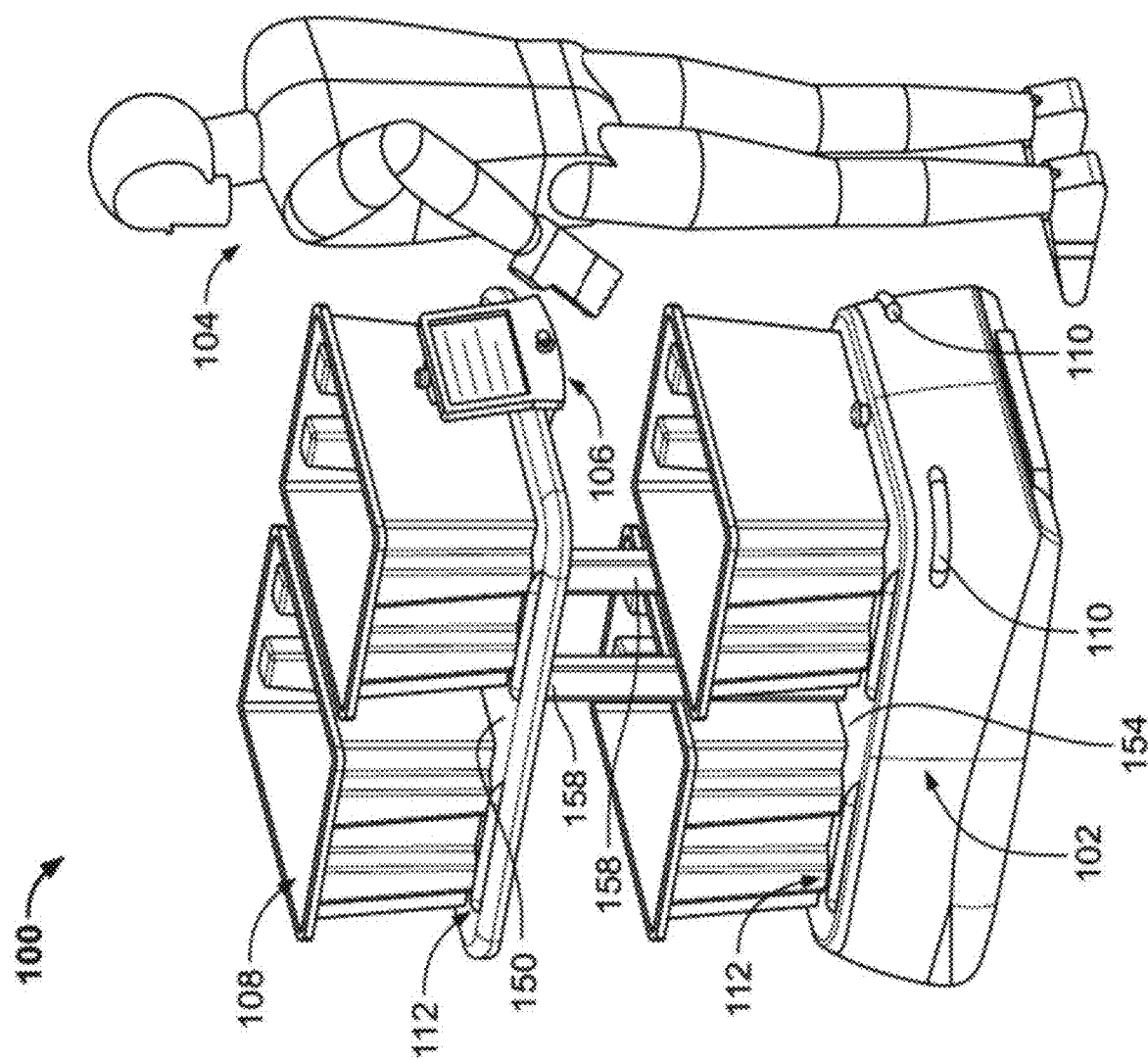
FIG. 1A is an illustration of an autonomous vehicle configured to collect items for an order in accordance with an example embodiment of the disclosure.

The example embodiments discussed herein are directed to systems and methods for assigning pick jobs to autonomous vehicles to improve the efficiency of a fulfillment center and, more particularly, to controlling the autonomous vehicles to navigate workers through the fulfillment center. The fulfillment management system at a fulfillment center must consider a multitude of variables in optimizing the operation of the fulfillment center for efficiency. Variables the fulfillment management system can address include the numbers of available autonomous vehicles and workers, the availability of inventory to fulfill the received orders, the received orders and the corresponding dates by which the customers expect to receive their orders, the location of inventory within the fulfillment center, the routing of autonomous vehicles within the fulfillment center to collect items, the time required to collect items for an order, the packing of items for an order at a pack-out station, and cutoff times for providing a packed order to a courier for shipping of the packed order. Additionally, the fulfillment center often has service level agreements with merchants that require fulfillment of certain orders by a shipping deadline or fulfillment of a certain number of orders each day. Customer orders can include a single item, a few items, or a large number items.

By controlling and optimizing the use of the autonomous vehicles operating at the fulfillment center, the fulfillment management system can use the autonomous vehicles and the workers more efficiently. More efficient use of the autonomous vehicles can reduce the number of autonomous vehicles required to satisfy shipping requirements, thereby minimizing the energy and costs associated with operation of the autonomous vehicles. Put another way, the fulfillment management system can maximize the use or throughput of a fixed number of the autonomous vehicles used at the fulfillment center.

A goal of the fulfillment management system can be to ensure that shipping deadlines for orders are satisfied while simultaneously maximizing the efficiency of the fulfillment center. The fulfillment management system may optimize the efficiency of the fulfillment center by evaluating one or more of the previously identified variables when creating pick jobs for gathering items for shipping. For example, an autonomous vehicle and/or a worker can complete a pick job more efficiently when the items for collection that are identified in the pick job are in proximity to each other within the fulfillment center. As another example, autonomous vehicles and/or workers can complete pick jobs more efficiently if the pick jobs are routed to minimize areas of congestion within the fulfillment center. As yet another example, maximizing the number of pick jobs handled and the number of items collected by an autonomous vehicle and/or worker on a single trip through the fulfillment center and minimizing the number of trips for single items or a small number of items further improves efficiency.

One way that fulfillment management systems can organize jobs to optimize efficiency is to schedule pick jobs based on a priority ordering that takes into account the previously mentioned variables. More particularly, a score can be assigned to each pick job that the fulfillment center must complete and the score can determine the order in which pick jobs are assigned to autonomous vehicles for completion. The score can reflect one or more of the previously identified variables, including the locations of the items, congestion at certain locations within the fulfillment center, and the number of items associated with the pick job. The score can also reflect a due date for the pick job. As an example, for pick jobs with approaching due dates, the due date will be reflected more heavily in the score so that the pick jobs with approaching due dates are prioritized over pick jobs with later due dates. In one implementation, pick jobs with lower scores can be assigned before pick jobs with higher scores. In such an implementation, the score is discounted more heavily for pick jobs with approaching due dates so that those pick jobs will be assigned ahead of pick jobs with later due dates reflected in a higher score.

Traditional approaches to allocating pick jobs to ensure they meet upcoming due dates are simplistic in that a heavy ship date bias is applied to the score associated with each pick job. In other words, the scores are tuned to emphasize due dates. While applying a heavy ship date bias ensures that the fulfillment center meets shipping deadlines, it can dramatically reduce the efficient operation of the fulfillment center. For instance, if there are a large number of pick jobs that must be completed in a day, a substantial ship date bias can be applied to the scores to ensure the pick jobs are completed by the shipping deadline. However, a substantial ship date bias will effectively override the other variables considered for efficiency in calculating the scores for the pool of pick jobs. In other words, the pick jobs will essentially be completed in ship-date order, which may be inefficient for picker walking distances or congestion areas within the fulfillment center, for example.

Simply prioritizing orders with approaching shipping deadlines ignores efficiency and the factors that can be considered in determining scores for jobs based on efficiency. Traditional approaches to allocating pick jobs are also limited in that they neither account for the pick rate of the fulfillment center nor do they provide for adjusting the pick rate when considering which pick jobs may be at risk of missing a shipping deadline.

Accordingly, fulfillment management systems that more efficiently manage the allocation of pick jobs would be beneficial. In particular, techniques for allocating pick jobs that balance the need to meet due dates with the goal of operating a fulfillment center more efficiently are desirable. Additionally, using pick rate data in the allocation of pick jobs will further improve the operation of fulfillment centers. As will be described further in the examples that follow, improving the allocation of pick jobs allows for more efficient use of the resources at the fulfillment center, including workers, autonomous vehicles, and the computing systems that operate the fulfillment center. Furthermore, more efficient operation of the fulfillment center will enable faster completion of pick jobs thereby improving the satisfaction of customers and merchants.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Enhanced Cart System Used in Example Embodiments

FIG. 1A illustrates an enhanced cart system 100 that can be used in the example embodiments described herein. The enhanced cart system 100 includes an enhanced cart 102 (also referred to as a picking cart) that can be an autonomous vehicle, a semi-autonomous vehicle, or simply a wheeled cart that is moved by a worker 104. The enhanced cart system 100 can include a user interface 106 (e.g. a touch screen, a tablet device, a personal digital assistant, a scanning device, etc.), indicator lights 110, 112, and one or more audio speakers that assist the worker accompanying the enhanced cart system 100. The enhanced cart 102 can be propelled by a motor (e.g., an electric motor) that is coupled to a power source (e.g., a battery, a supercapacitor, etc.) that can be periodically recharged. Workers within a fulfillment center can use enhanced carts to move inventory within the fulfillment center. The workers can be humans, robots, or a combination of humans and robots. Workers can use enhanced carts for tasks such as picking, re-stocking, moving, sorting, counting, or verifying items. The term "item" is used herein broadly to encompass any product that may be gathered at a fulfillment center for shipping to a customer.

As illustrated in FIG. 1A, one or more storage containers 108 (also referred to as totes) may be placed on the enhanced cart 102 for containing items gathered throughout the fulfillment center. The gathering and placement of items into the storage containers 108 can be done by workers, can be automated by machines, or can be performed through a combination of workers and machines. The storage containers 108 are also removable from the enhanced cart 102, such as when the storage containers holding the gathered items arrive at a pack-out station for packing and shipping. In some cases, each storage container 108 can be used for a single order. In other cases, a storage container 108 can be used for batch picking where the container holds multiple complete or partial orders that are delivered to a post-pick station for sorting, processing, and packing. Hybrid approaches are possible in some cases where one storage container 108 on the enhanced cart 102 is for a single order while another storage container on the same enhanced cart 102 is used for batch picking. In some cases, the single order may be a time sensitive order, whereas the batch picking is associated with orders that are less time sensitive. In yet other cases, the storage containers 108 can be used for items that are to be counted or items that are to be moved or re-stocked within the fulfillment center.

Figure 1B:
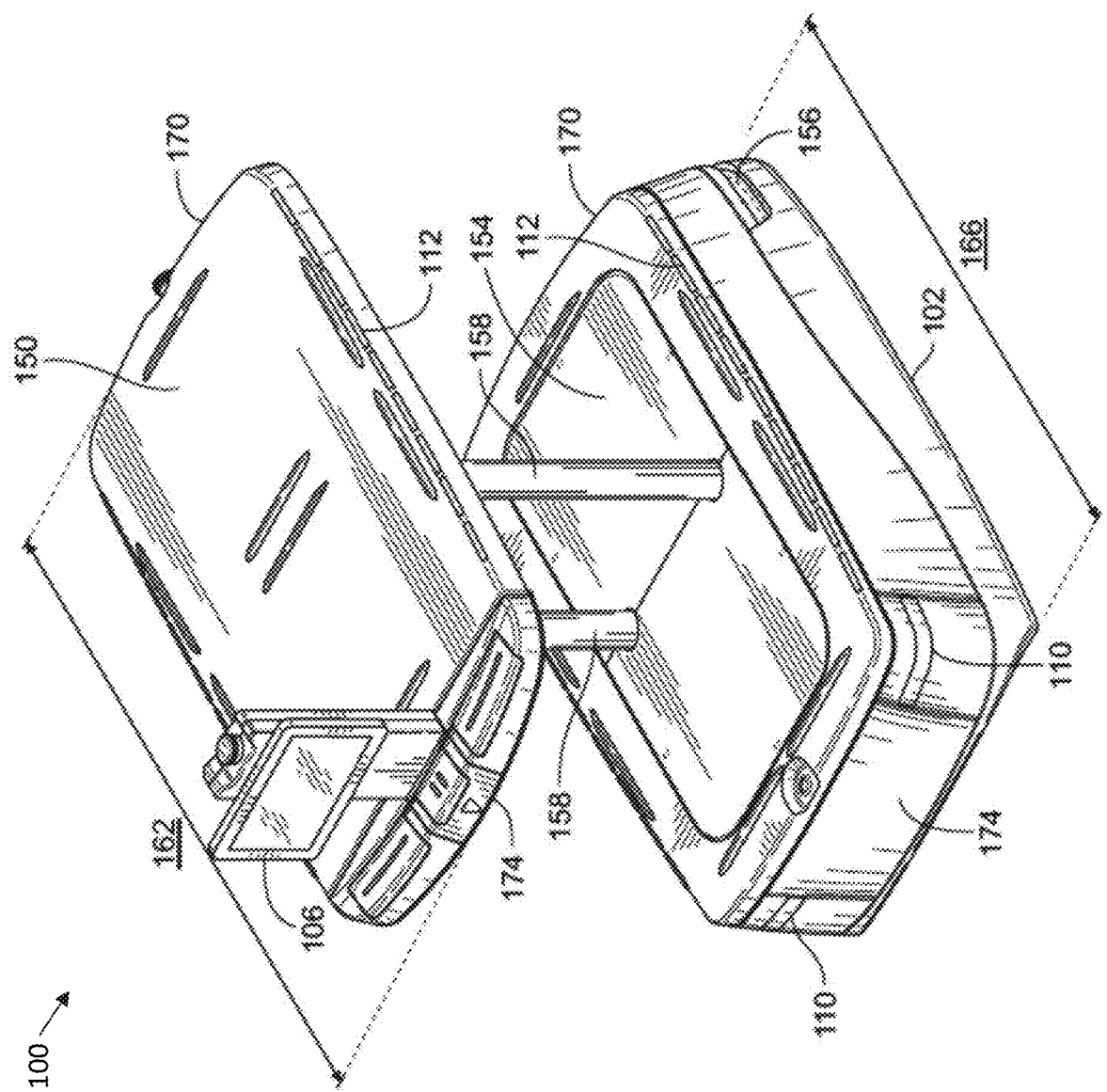
FIG. 1B is an illustration of another autonomous vehicle configured to collect items for an order in accordance with an example embodiment of the disclosure.

FIG. 1B illustrates another example of an enhanced cart system 100, but with the storage containers removed for purposes of illustration. As with the example of FIG. 1A, the enhanced cart system 100 of FIG. 1B includes an enhanced cart 102 having a user interface 106 and indicator lights 110, 112. The enhanced cart 102 of both FIGS. 1A and 1B can include upper and lower platforms 150, 154 on which the storage containers 108 can be placed. At least one support 158 can support the upper platform 150 above the lower platform 154. The at least one support 158 can be substantially centrally-located along the respective lengths 162, 166 of the upper and lower platforms 150, 154 between the front end 170 and back end 174 of the enhanced cart 102. As illustrated in FIG. 1B, the front end 170 of the enhanced cart 102 can define a recess 156. One or more sensors (e.g., light detecting and range detecting) can be housed within the recess 156. The recess 156 permits the one or more sensors to have a field of detection in front of and to the side of the enhanced cart 102.

The following discussion will describe the use of enhanced cart systems in connection with the allocation of pick jobs. While the examples that follow refer to the specific example of an autonomous vehicle for the enhanced cart system, it should be appreciated that carts of varying complexity and features can be used in the described examples.

Fulfillment Management System

Figure 2:
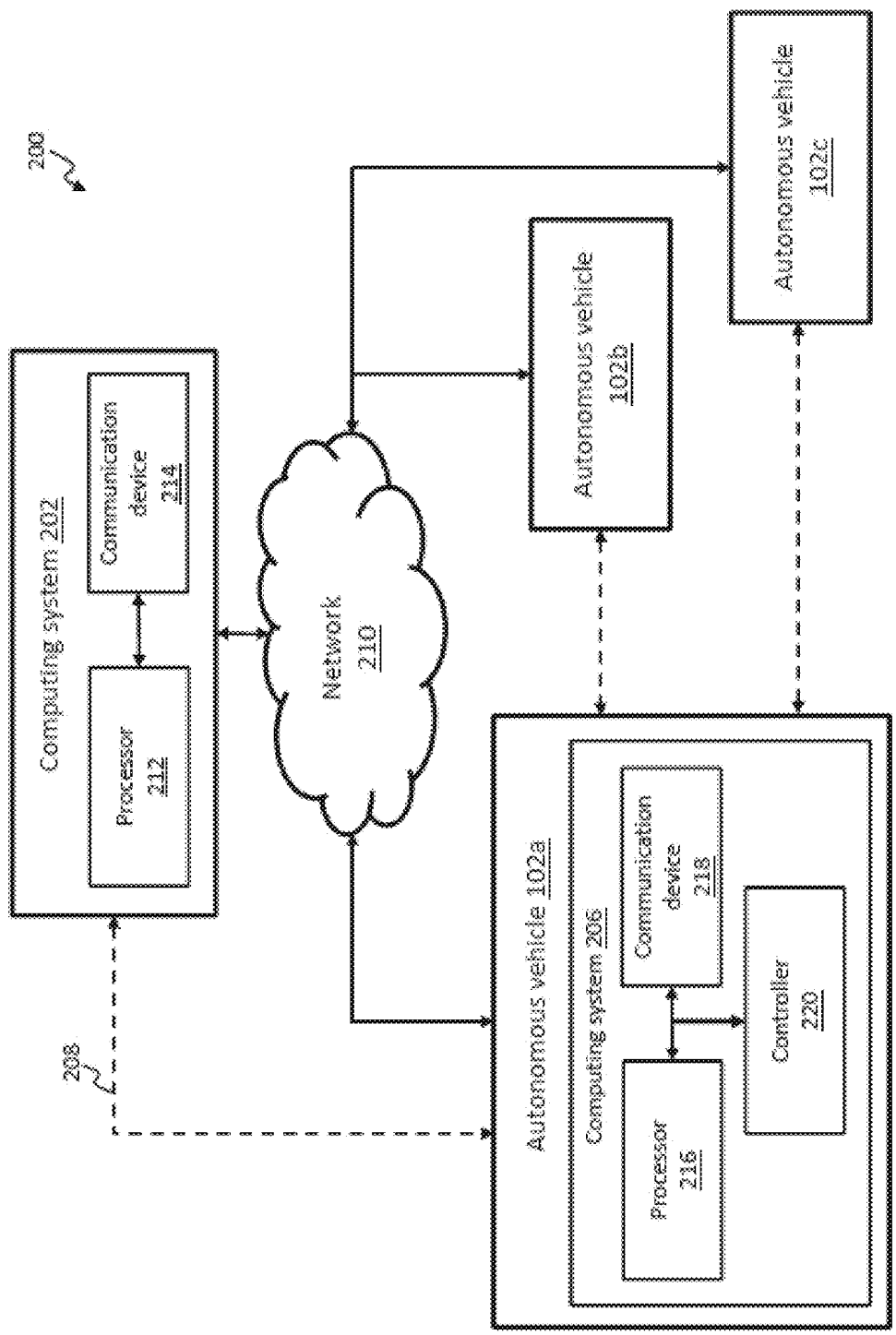
FIG. 2 is a block diagram of a system for managing order fulfillment in accordance with an example embodiment of the disclosure.

FIG. 2 illustrates a block diagram of a fulfillment management system 200 configured to manage orders within one or more fulfillment centers. The fulfillment management system 200 can receive customer orders from an order processing system. Alternatively, the fulfillment management system can be a part of the order processing system. The order processing system can receive orders from customer devices (e.g. phones, smartphones, computers) or from e-commerce computing systems. The order processing system can organize orders for fulfillment by identifying the availability at the fulfillment center of items within the order. The order processing system can also place orders and items in groupings, which can be referred to as pick jobs, for use in gathering the items from the fulfillment center.

The fulfillment management system 200 can include a computing system 202 configured to be coupled directly or indirectly to one or more autonomous vehicles 102a, 102b, and 102c (collectively referred to as 102) such as the autonomous vehicles described in connection with FIGS. 1A and 1B. In one example, the computing system 202 can communicate directly with the computing system 206 of an autonomous vehicle 102 via a communication channel 208. Additionally or alternatively, the computing system 202 can communicate with one or more autonomous vehicles 102 via a network device of network 210. In some embodiments, computing system 202 can communicate with a first autonomous vehicle (e.g., vehicle 102a) via a second autonomous vehicle (e.g. vehicle 102b).

The computing system 202 of the example fulfillment management system 200 can be located locally at the fulfillment center, can be located remotely from the fulfillment center (e.g., hosted in a cloud computing system), or can be distributed with components located both locally and remotely. As shown in FIG. 2, example computing system 202 can include a processor 212 that communicates with a communication device 214. The communication device 214 can receive messages from and transmit messages to the processor 212 and the autonomous vehicles 102. For example, messages sent to the autonomous vehicles 102 can include picking instructions (e.g., product name, product description, product image, quantity, location within the fulfillment center), navigation instructions, and shipping deadlines. Messages the autonomous vehicles 102 can transmit to the communication device 214 include confirmations when an item is picked or a pick job is complete and exception messages indicating that an item is not available for collection at a bin or shelf within the fulfillment center. The messages can be visual and/or audible and can be communicated using the user interface 106 and the indicator lights 110, 112.

The example system of FIG. 2 also illustrates certain components of example autonomous vehicle 102a. Example autonomous vehicle 102a can include a vehicle computer system 206 that comprises a vehicle processor 216, a vehicle communication device 218, and a vehicle controller 220. The vehicle communication device 218 can communicate with communication device 214 via channel 208 or via network 210. The vehicle processor 216 can process signals from the communication device 214, from the vehicle communication device 218, and from other components onboard the autonomous vehicle 102a such as light detecting or range detecting sensors. The vehicle controller 220 can send control signals to components onboard the autonomous vehicle 102a such as a navigation system that controls the movement of the autonomous vehicle 102a. As one example, the vehicle computer system 206 can receive a job from computing system 202, wherein the job identifies one or more items to be retrieved and locations for the one or more items within the fulfillment center. The vehicle controller 220 and the navigation system can use the location information associated with the one or more items to navigate the autonomous vehicle to the inventory location (e.g., bins or shelves) containing the one or more items. The other autonomous vehicles 102b, 102c can include components similar to those shown on autonomous vehicle 102a.

Prioritizing Pick Jobs while Optimizing Efficiency

As explained previously, improving the techniques for allocating pick jobs can improve the efficiency of the fulfillment center. The fulfillment management system can be used to improve the techniques for allocating pick jobs and can transmit the pick jobs to the autonomous vehicles for gathering items. A worker can move through the fulfillment center with the autonomous vehicle and gather the items in the pick job from inventory locations, such as bins and/or shelves. As the items are gathered, they are placed in the storage containers on the autonomous vehicle.

Meeting due dates for shipping items is a critical function of fulfillment centers. Failing to meet due dates can cause the fulfillment center to operate inefficiently because it can result in pending or incomplete pick jobs accumulating at the fulfillment center and can force the fulfillment center to alter operations in order to catch up on pick jobs with missed due dates. Missing due dates for items also can result in dissatisfied merchants and customers. However, if pick jobs are assigned primarily based on associated due dates without accounting for efficiency, workers may be routed inefficiently throughout the fulfillment center, workers may be assigned small pick jobs in an inefficient manner, and congestion points may develop within the fulfillment center.

An improved approach to managing pick jobs within a fulfillment center strikes a balance between ensuring that shipping deadlines are met, while at the same time sacrificing efficiency as little as possible. The fulfillment management system can ensure that shipping deadlines are met by determining which pick jobs may be at risk of missing a shipping deadline and prioritizing those at-risk pick jobs over other jobs where there is no present risk of missing a shipping deadline. On the other hand, the fulfillment management system can continue to optimize for efficiency by using a scoring system in combination with the prioritization of at-risk pick jobs. The scoring system can associate a score with each pick job based on efficiency. The at-risk pick jobs assigned a higher priority maintain their scores so that the priority jobs can be sorted within the higher priority queue and assigned according to their scores. Pick jobs that are not assigned to the higher priority queue also continue to have an associated score and can be completed in a sequence according to their scores. The scoring of the pick jobs and the assignment of priority to at-risk pick jobs can be regularly updated as conditions change at the fulfillment center.

Favoring efficient fulfillment of orders too heavily may jeopardize shipping deadlines, but focusing too narrowly on shipping deadlines may degrade the overall efficiency of the fulfillment management system. The improved techniques disclosed herein can achieve the desired balance of meeting shipping deadlines for orders and completing the fulfillment of orders in an efficient manner. Achieving this balance allows the workers and autonomous vehicles to operate more efficiently and smoothly within the fulfillment center. Improving the operation of the autonomous vehicles can reduce energy costs by reducing wasteful trips throughout the fulfillment center and reducing the number of autonomous vehicles needed to satisfy shipping requirements. In other words, maximizing the throughput for a fixed number of autonomous vehicles reduces the equipment and energy usage for the fulfillment center. Additionally, managing workers more efficiently reduces congestion within the fulfillment center which improves worker safety. When the autonomous vehicles and workers are used more efficiently, it relieves demand on the resources (e.g., processing and memory) of the computing system 202. Additionally, when the fulfillment center operates more efficiently, orders can be fulfilled more quickly thereby improving merchant and customer satisfaction.

Figure 3:
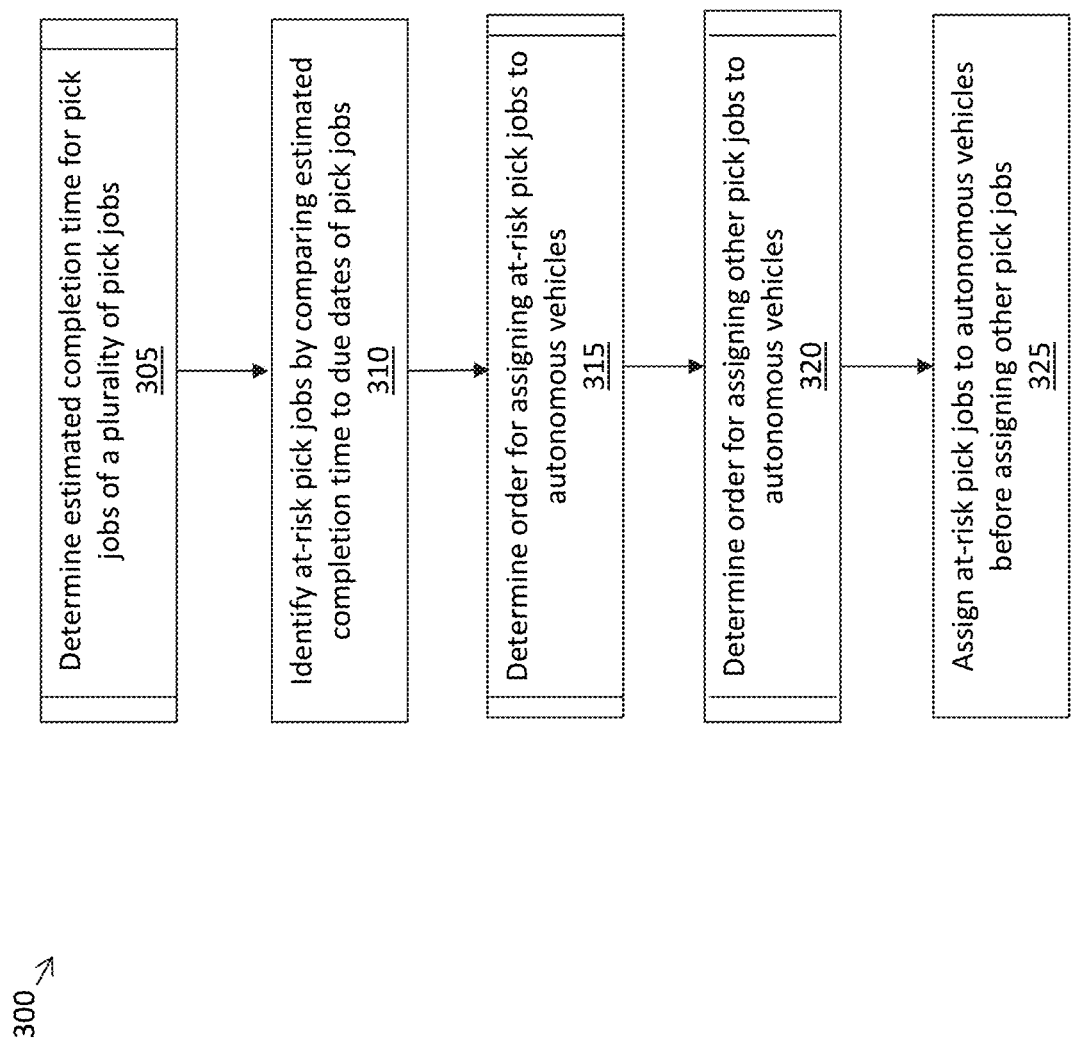
FIG. 3 is a flow chart illustrating a method for classifying and assigning pick jobs in accordance with an example embodiment of the disclosure.

Turning to FIG. 3, an example method 300 is illustrated for improving the allocation of pick jobs at a fulfillment center. The operations of example method 300 can be implemented as computer-readable instructions executed by computing system 202. It should be understood that in alternate embodiments certain operations of method 300 can be combined or other operations may be added to method 300. Example method 300 classifies a set of pick jobs and assigns the classified pick jobs to autonomous vehicles within the fulfillment center for completion. The pick jobs that are classified may be the pool of all of the pick jobs that are currently awaiting assignment by the computing system 202. Alternatively, the pick jobs that are classified may be a subset of pick jobs from the entire pool of pick jobs. For example, the pick jobs that are classified may be all of the pick jobs to be completed during a particular day, during a particular worker shift, or during an interval such as the next three hours. It should be understood that method 300 can be repeated at a selected frequency or as new pick jobs or new information become available to the fulfillment center.

In operation 305 of example method 300, a determination is made of the estimated completion time for a set of pick jobs that are to be classified. For example, the computing system 202 may determine an estimated time at which the set of pick jobs will be completed by the autonomous vehicles and/or workers of the fulfillment center. This determination can be performed by applying a pick rate to the set of pick jobs as will be described further in connection with FIG. 4.

In operation 310 of example method 300, the computing system 202 can compare the estimated completion time for the set of pick jobs to due dates associated with the pick jobs. The estimated completion time is the estimated time at which the collection of items associated with the pick jobs is completed. The estimated completion time may be an estimated time at which all of the pick jobs within the set would be completed. Alternatively, estimated completion times for pick jobs could be determined on an individual basis. The term "due dates" is used broadly within this application and can refer to dates as well as particular times during a day and may refer to any of a variety of deadlines that can be associated with a pick job. For instance, the due date may refer to a shipping deadline by which the order associated with the pick job must be shipped from the fulfillment center in order to meet a customer or merchant deadline. Alternatively, the due date may refer to a time by which the pick job must be delivered to a pack out station within the fulfillment center. As yet another alternative, the due date may refer to a delivery deadline by which the order associated with the pick job must be received by the customer.

By comparing the estimated completion time for the pick jobs against due dates associated with the pick jobs, the computing system 202 can identify any pick jobs that are estimated to be completed after the due date associated with the pick job. The computing system 202 can identify any such pick jobs as at-risk pick jobs. In certain embodiments, the computing system 202 can associate a priority indicator with any identified at-risk pick jobs.

FIG. 3A provides a simplified illustration of an example data structure 350 that may be stored in memory associated with computing system 202. The data structure 350 includes six pick jobs numbered 1-6 that may be assigned to an autonomous vehicle, which can also be referred to as a "chuck." While in practice fulfillment centers commonly handle hundreds or thousands of pick jobs in a single day, the data structure 350 has been simplified for illustrative purposes. As shown in the example data structure 350, each pick job can have associated job parameters, such as a number of items to be collected, the locations of the items, and a due date. In other examples, the job parameters can include other data such as a calculation of the distance that will be traveled based on the locations of items to be collected from throughout the fulfillment center. The example data structure 350 also shows a pick rate reflecting the speed with which pick jobs can be completed. In the simplified example of FIG. 3A, it is assumed the current time is 15:30 and applying the pick rate of 60 lines per hour results in an estimated completion time for the six pick jobs. As illustrated in FIG. 3A, it is estimated that the chuck, or autonomous vehicle, will complete pick jobs 1 and 2 by the due date of 16:00, but only with a 25 minute and 15 minute buffer, respectively. It is further estimated that pick jobs 3 and 4 will not be completed by their respective due dates of 16:00. Based on the estimated completion times, pick jobs 1, 2, 3, and 4 are identified as at-risk pick jobs and an at-risk indicator, or priority indicator, is associated with these jobs. It should be understood that in alternate embodiments, the data structure can be organized in a different manner and can include other data.

Referring again to FIG. 3, in operation 315, the computing system 202 can determine an order for assigning at-risk pick jobs to the autonomous vehicles for completion. In determining the order for assigning the at-risk pick jobs, the computing system 202 can sequence the at-risk pick jobs based on the due dates associated with those jobs. Alternatively, the computing system 202 can sequence the at-risk jobs based on several factors where the associated due date is the primary factor. The process for determining the order of assigning at-risk pick jobs is described in further detail in connection with FIG. 5.

In operation 320, the computing system 202 can determine an order for assigning other pick jobs in the set of pick jobs that are not at-risk pick jobs. As described further in connection with FIG. 6, the other pick jobs can be ordered based on the scores associated with those pick jobs.

Lastly, in operation 325, the computing system 202 can assign the at-risk pick jobs to autonomous vehicles in the order determined in operation 315. The at-risk pick jobs can be assigned to a priority work queue, or an at-risk work queue, so that they are completed ahead of the other pick jobs. Referring to the example of FIG. 3A, at-risk pick jobs 1, 2, 3, and 4 can be placed in the priority work queue, which may be a distinct data structure stored in memory. The computing system 202 can also assign the other pick jobs to the autonomous vehicles for completion after the at-risk pick jobs. Referring again to the example of FIG. 3A, other pick jobs 5 and 6 can be placed in a second work queue that is completed after the priority work queue and which may be a distinct data structure in memory.

Determine and Apply Pick Rate

Figure 4:
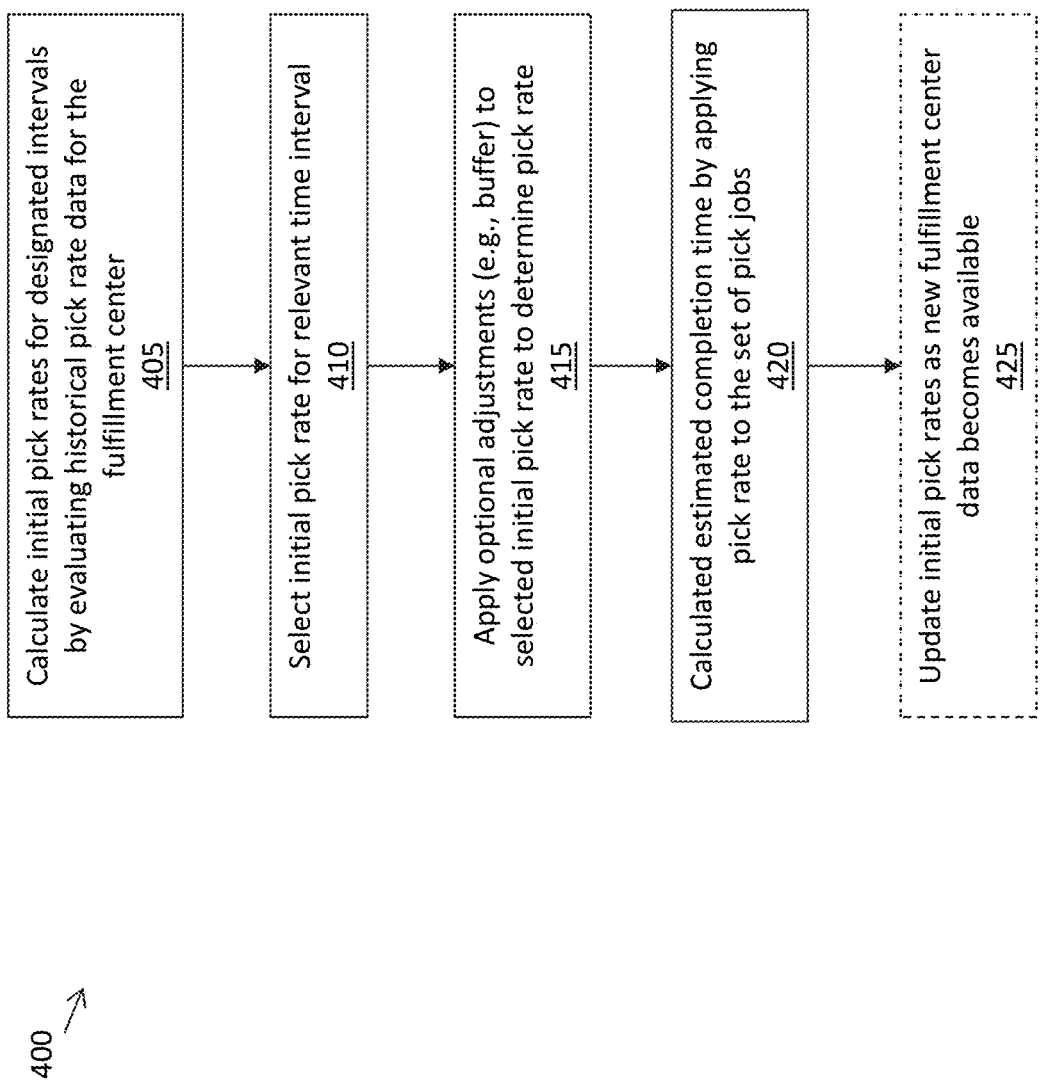
FIG. 4 is a flow chart illustrating a method for determining pick rates and pick job completion times in accordance with an example embodiment of the disclosure.

FIG. 4 illustrates an example method 400 for determining and applying a pick rate as referenced in operation 305 of example method 300. The operations of example method 400 can be implemented as computer-readable instructions executed by computing system 202. It should be understood that in alternate embodiments certain operations of method 400 can be combined or other operations may be added to method 400.

In operation 405, the computing system 202 can calculate initial pick rates for the fulfillment center. A pick rate reflects the speed with which pick jobs are completed at the fulfillment center. Pick jobs can have varying configurations in that they can be based on a number of items to be collected, a quantity of items to be collected, or a number of inventory locations to be visited within the fulfillment center. The pick rate can be reflective of the configuration of the pick jobs.

The initial pick rates can be associated with a time interval at the fulfillment center such as a day, a worker shift, or the next hour. The initial pick rates can be based on historical pick rate data gathered for the fulfillment center. For example, calculating an initial pick rate for the night shift at the fulfillment center may be based on pick rate data gathered from previous night shifts at the fulfillment center. The pick rate data for the night shift may differ from the pick rate data for day shifts due to re-stocking work performed at night. In calculating initial pick rates for the fulfillment center, the computing system 202 can make calculations for various time intervals and create a schedule of initial pick rates customized for each time interval.

In operation 410, the computing system 202 can select an initial pick rate, based on the time interval of interest, from the schedule of initial pick rates. Referring to the example data structure of FIG. 3A, the time interval of interest was a pick rate for the next hour in light of the pick jobs with approaching due dates.

In operation 415, the computing system 202 can apply optional adjustments to the initial pick rate in order to determine the pick rate that will be used. One example of an adjustment is adding a buffer to the initial pick rate. The buffer can reduce the initial pick rate by a certain percentage to account for variations that may occur in the pick rate or to allow additional time for completing the pick jobs. Other adjustments can be based on statistical analysis of the historical pick rate data.

Referring to operation 420, the computing system 202 calculates an estimated completion time for the pick jobs in the set of pick jobs being classified by applying the determined pick rate to the pick jobs. As explained previously, the pick jobs may be configured in various ways such as a number of items to be collected, a quantity of items to be collected, or a number of inventory locations to be visited within the fulfillment center. Therefore, the pick rate should be applied in a manner consistent with the configuration of the pick jobs in order to arrive at an accurate estimate of the completion time for the pick jobs.

As illustrated in optional operation 425, the computing system 202 can update the initial pick rates for the fulfillment center as new data becomes available. Updating the initial pick rates ensures that the most accurate information available is used in determining the pick rate.

The method illustrated in FIG. 4 describes determining and applying a pick rate for a fulfillment center. As an alternative, the pick rate for an individual autonomous vehicle can be determined and applied. As one example, if a fulfillment center has a pick rate of 60 and has 10 operating autonomous vehicles, each autonomous vehicle has a pick rate of 6. If there is a single pick job with 6 lines to pick, applying the fulfillment center pick rate produces an estimate that the pick job can be completed in 10 minutes. However, because a single pick job cannot be divided among multiple autonomous vehicles, the actual time required for one autonomous vehicle to complete the pick job will be 60 minutes. In other words, a pick job cannot be completed faster than a single autonomous vehicle can pick, regardless of the pick rate for the entire fulfillment center. The pick rate for a single autonomous vehicle also may be considered in determining pick jobs that are at risk.

Scoring and Ordering at-Risk Pick Jobs

Figure 5:
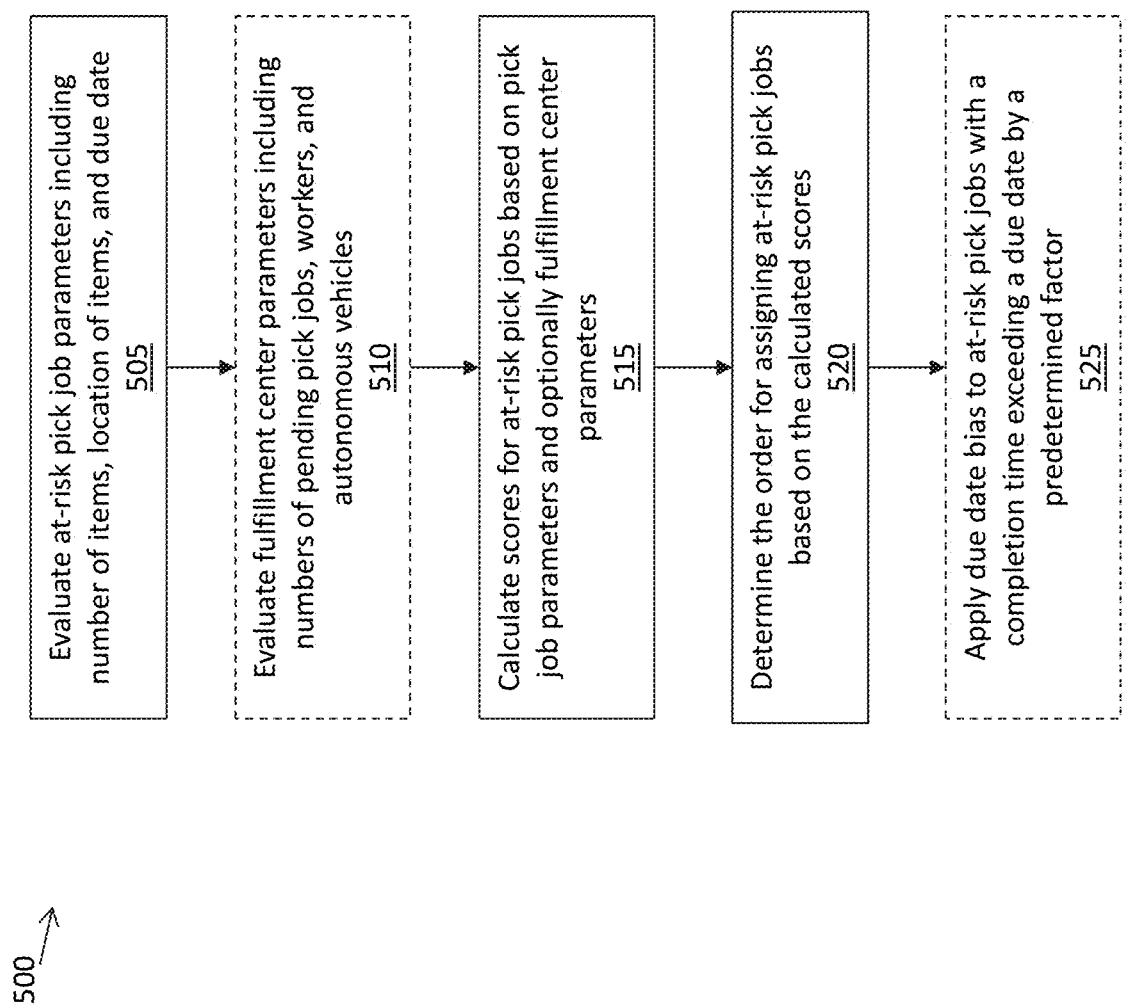
FIG. 5 is a flow chart illustrating a method for scoring and ordering at-risk pick jobs in accordance with an example embodiment of the disclosure.

FIG. 5 illustrates an example method 500 for determining scores and an order for assigning the at-risk pick jobs as referenced in operation 315 of example method 300. The operations of example method 500 can be implemented as computer-readable instructions executed by computing system 202. It should be understood that in alternate embodiments certain operations of method 500 can be combined or performed in a different sequence, or other operations may be added to method 500.

In operation 505, the computing system 202 evaluates the job parameters associated with each pick job. The data structure 350 of FIG. 3A provides non-limiting examples of the types of job parameters that can be evaluated in order to determine a score for an at-risk pick job. For example, at-risk pick jobs 2, 3, and 4 have a higher score than pick job 6 because they involve more items to be collected. In other embodiments, the distance to be traversed within the fulfillment center based on the locations of the items can also be a job parameter that is evaluated. Calculation of the score can also include evaluation of the due date associated with the at-risk pick job.

In addition to the job parameters, in optional operation 510, the computing system 202 also can evaluate fulfillment center parameters that may affect the pick job. For example, if the fulfillment center is very busy with a large number of pick jobs being completed, congestion in the routing of pick jobs may be a factor that affects the job parameter for item locations. Other fulfillment center parameters that the computing system 202 can evaluate in calculating a score can include the numbers of available workers and autonomous vehicles for performing the pick jobs.

In operation 515, the computing system 202 can calculate a score for each of the at-risk pick jobs based on the job parameters and, optionally, the fulfillment center parameters. The score is calculated to rank the at-risk pick jobs based on an efficiency with which the at-risk pick jobs can be completed. In this way, the score is used to complete more efficient at-risk pick jobs ahead of less efficient at-risk pick jobs. In some cases, as the more efficient at-risk pick jobs are completed, the efficiencies associated with the less efficient at-risk pick jobs can improve. Thus, the score can be used to bias the completion of the at-risk pick jobs in an efficient approach as opposed to simply ordering jobs based on due date.

As explained in connection with method 300 of FIG. 3, the at-risk pick jobs are prioritized for completion ahead of the other jobs that are not at risk of missing their due date. However, within the queue of prioritized at-risk pick jobs, the computing system 202 can determine an order for the at-risk pick jobs based on the calculated score in operation 520. Ordering the subset of at-risk pick jobs based on their calculated scores ensures that the at-risk pick jobs will be performed with efficiency optimized.

Operation 525 provides an optional step that may be performed if due dates are at a high risk of being missed. With respect to the subset of at-risk pick jobs, if the computing system 202 determines there are particular at-risk pick jobs with a high risk of missing due dates, the computing system 202 can apply an additional due date bias to those pick jobs. For example, if the estimated completion time for an at-risk pick job exceeds the due date by a predetermined factor, simply placing the pick job in the priority queue for at-risk pick jobs may be insufficient to ensure the due date will be satisfied. Accordingly, in order to ensure that the fulfillment center will meet the due date for such a high risk pick job, the computing system 202 can apply an additional due date bias to the score associated with the high risk pick job to ensure it is prioritized ahead of other at-risk pick jobs.

The approach of example method 500 orders the at-risk pick jobs primarily based on due date, but also uses the scores associated with the pick jobs to factor in efficiency. This approach allows the computing system 202 to balance the competing goals of meeting due dates while also completing the at-risk pick jobs efficiently. As such, the overall fulfillment center can operate more efficiently and complete pick jobs with greater expediency. Factoring efficiency into the ordering of the at-risk pick jobs saves resources with respect to workers, autonomous vehicles, and the computing systems that operate the fulfillment center. Additionally, improving the operation of the fulfillment center benefits the customers and merchants that the fulfillment center serves.

While example method 500 describes the calculation of the scores associated with the at-risk pick jobs, it should be understood that the scores can be calculated at other times such as prior to the classification steps of method 300. It should also be understood that the scores can be periodically updated to reflect changes in the item locations, due dates, or fulfillment center parameters.

Scoring and Ordering Other Pick Jobs

Figure 6:
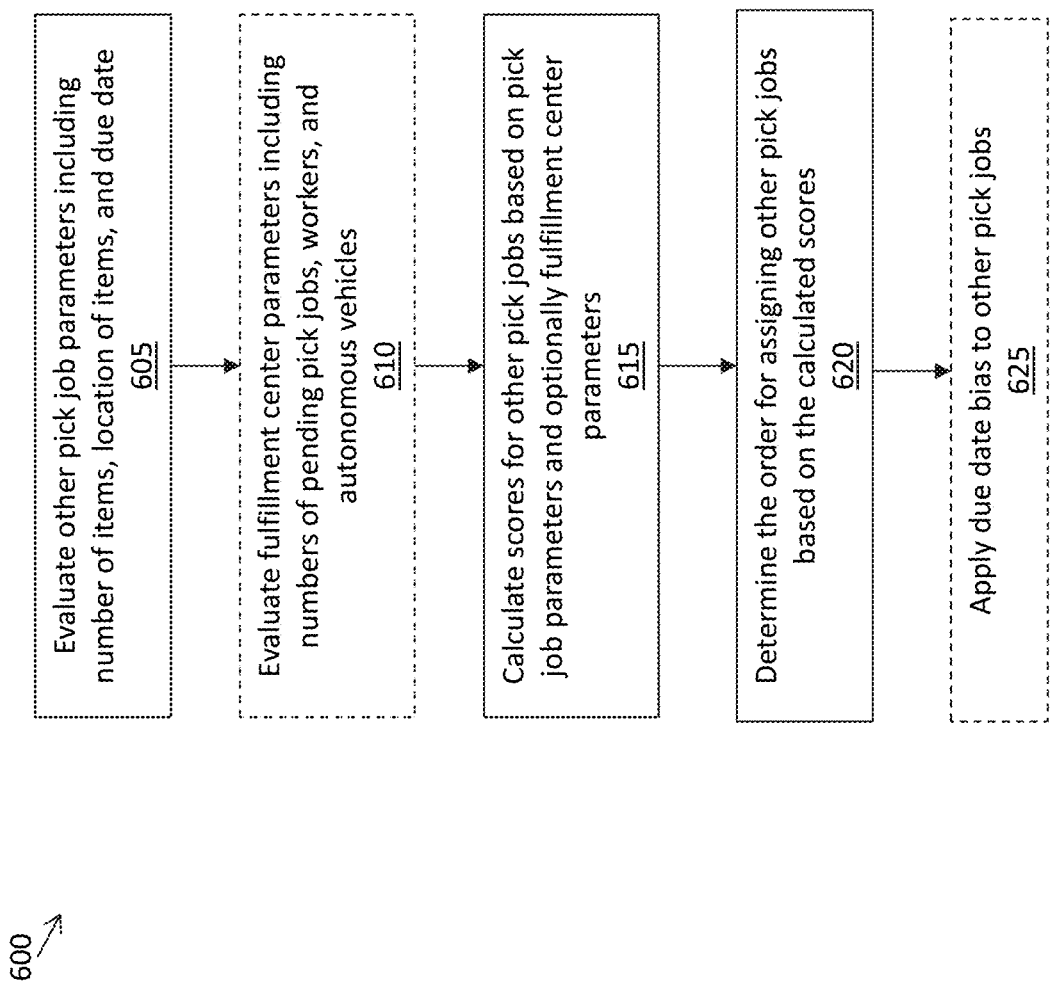
FIG. 6 is a flow chart illustrating a method for scoring and ordering no-risk pick jobs in accordance with an example embodiment of the disclosure.

FIG. 6 illustrates an example method 600 for determining scores and ordering other pick jobs that are not at-risk pick jobs as referenced in operation 320 of example method 300. The other pick jobs of method 600 can also be referred to as no-risk pick jobs. The operations of example method 600 can be implemented as computer-readable instructions executed by computing system 202. It should be understood that in alternate embodiments certain operations of method 600 can be combined or performed in a different sequence, or other operations may be added to method 600.

Similar to previously described operation 505, in operation 606 computing system 202 can evaluate job parameters for the subset of the no-risk pick jobs. The evaluated job parameters can include the number of items, the locations of the items within the fulfillment center, and the due dates associated with the no-risk pick jobs. The computing system 202 evaluates the job parameters based on efficiency. Referring to FIG. 3A as an example, no-risk pick job 6 has a greater efficiency reflected by its lower score than no-risk pick job 5 because the items of no-risk pick job 5 has more line items, which will require a greater distance to be traveled within the fulfillment center.

Operation 610 is an optional step in which computing system 202 can evaluate fulfillment center parameters. As described previously for operation 510, fulfillment center parameters such as the numbers of available workers and autonomous vehicles can affect the job parameters.

In operation 615, computing system 202 calculates scores for each of the no-risk pick jobs based on the evaluation of the job parameters and, optionally, the fulfillment center parameters. Similar to the explanation in connection with operation 515, the score associated with each no-risk pick job is an indication of the efficiency with which the job can be completed.

In operation 620, computing system 202 determines the order for assigning the no-risk pick jobs based on the calculated scores. Because the calculated scores are associated with efficiency, using the calculated scores to order the no-risk pick jobs favors completion of the jobs based on efficiency instead of prioritizing jobs based on due date. Using an efficiency approach, instead of a due date approach, to completing the no-risk pick jobs can have a dramatic effect on the overall efficiency of the fulfillment center when completing hundreds or thousands of pick jobs every day. Given the large numbers of pick jobs that are handled on a daily basis, achieving small efficiency gains in the allocation of sets of pick jobs can accumulate into substantial savings in time, worker hours, computing resources, and the energy used to power the autonomous vehicles.

Lastly, operation 625 provides an optional step that may be performed for the no-risk pick jobs. Even though the no-risk pick jobs are not at risk of missing a shipping deadline, it may be desirable to order these other jobs based on due date. In such a case, the computing system 202 can apply an additional due date bias to those other pick jobs. The due date bias can be applied to the score associated with some or all of the other pick jobs.

Application of the Classifying and Order Techniques

FIG. 7 provides an illustration explaining the application of the classification techniques described in connection with the example methods of FIGS. 3-6. FIG. 7 illustrates three different fulfillment centers, A, B, and C that are operating at a pick rate of 100 lines per hour. Each of the three fulfillment centers has pick jobs with upcoming due dates.

If the classification and ordering techniques described herein are not applied to fulfillment centers A, B, and C of FIG. 7, the pick jobs will be handled in the same manner at each fulfillment center and would be completed solely based on due date. At fulfillment center A, all 100 lines would be worked on, including job X. At fulfillment center B, job X would not be handled until it was certain the 1 pm and 2 pm lines are complete. At fulfillment center C, job X would be completed along with the other 5 pm lines before turning to the 7 pm lines and then the 8 pm lines.

However, when the classification and ordering techniques described herein for emphasizing efficiency are applied, the pick jobs in FIG. 7 will be handled differently. At fulfillment center A, the 100 lines due at 5 pm would be classified as no-risk pick jobs because they can be completed well before 5 pm at the pick rate of 100 lines per hour. Therefore, the 100 lines at fulfillment center A can be ordered based on the scores associated with each pick job so that pick jobs are completed in order of efficiency.

At fulfillment center B the methods described herein would classify the 1 pm lines and the 2 pm lines as at-risk pick jobs based on the pick rate of 100 lines per hour. However, the methods described herein can also use the scores associated with the 1 pm lines and the 2 pm lines to order those jobs within the subset of at-risk pick jobs based on efficiency. Additionally, given the tighter deadline for the 1 pm at-risk lines, a due date bias can also be applied to the 1 pm at-risk lines to ensure they are completed ahead of the 2 pm at-risk lines. After the 2 pm at-risk lines are completed, unless other factors have changed, the 5 pm lines would be classified as no-risk lines and would be ordered based solely on efficiency using the scores associated with the pick jobs.

Lastly, applying the methods described herein at fulfillment center C, initially, all of the 5 pm, 7 pm, and 8 pm lines can be classified as no-risk pick jobs because it is currently Noon and all of the lines should be completed by 8 pm given the 100 lines per hour pick rate. Therefore, all of the pick jobs at fulfillment center C can be ordered for efficiency based on their associated scores and substantial efficiency gains are possible. If during the day there are changing factors that cause the 5 pm lines to be at risk, they can be moved to the at-risk pick job subset and they can be prioritized ahead of other pick jobs.

Computing Systems

In certain embodiments, some or all of the processing operations described in connection with the foregoing methods can be performed by computing systems such as a personal computer, a desktop computer, a centralized computer, or cloud computing systems. As explained previously, certain operations of the foregoing methods can be performed by a combination of computing systems.

Figure 8:
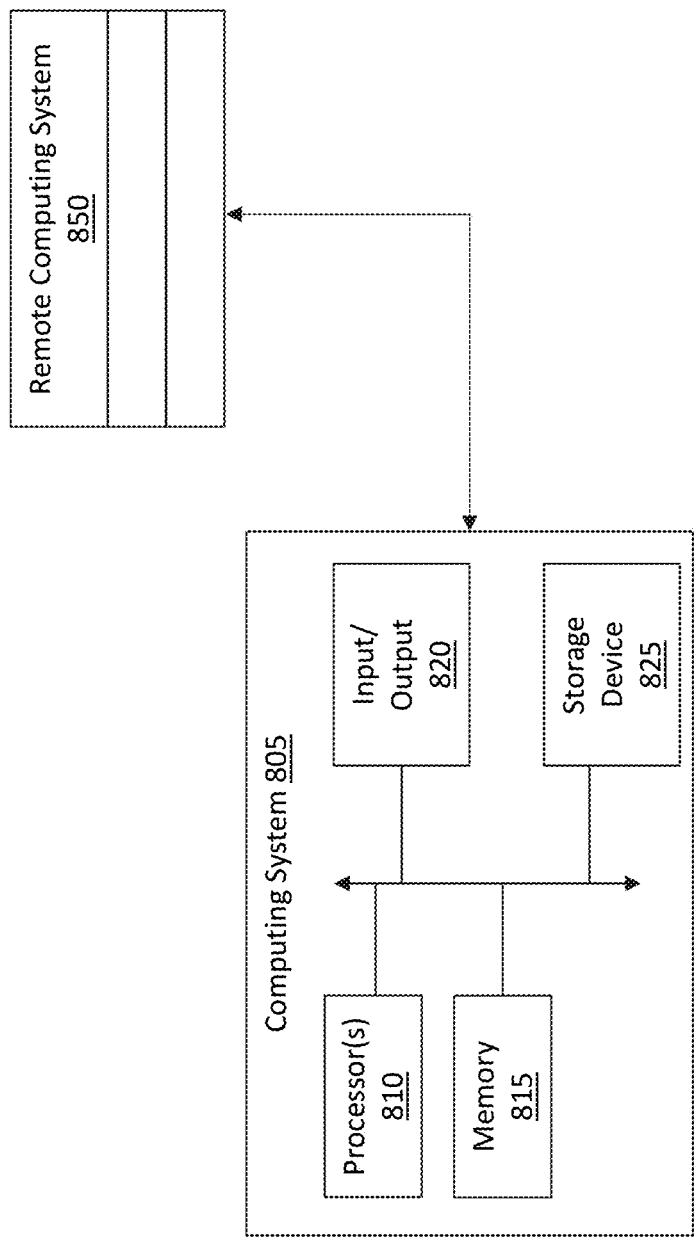
FIG. 8 is a block diagram of a computing system in accordance with an example embodiment of the disclosure.

Referring to FIG. 8, an example of a computing system is illustrated. The computing system 805 can represent a component of or one of the computing systems previously described herein, including a fulfillment management system, an order processing system, an e-commerce computing system, computing system 202, and vehicle computing system 206. Computing system 805 includes a processor 810, a memory 815, an input/output device 820, and a storage device 825. Each of the components of the computing system 805 can be interconnected, for example, by a system bus. The components of computing system 805 shown in FIG. 8 are not exhaustive, and in some embodiments, one or more of the components shown in FIG. 8 may not be included in an example system. Further, one or more components shown in FIG. 8 can be rearranged.

The processor 810 can be one or more hardware processors and can execute computer-readable instructions, such as instructions stored in memory 815. The processor 810 can be an integrated circuit, a central processing unit, a multi-core processing chip, an SoC, a multi-chip module including multiple multi-core processing chips, or other hardware processor in one or more example embodiments. The hardware processor is known by other names, including but not limited to a computer processor, a microprocessor, and a multi-core processor.

The memory 815 can store information including computer-readable instructions and data associated with the fulfillment center. The memory 815 can be cache memory, a main memory, and/or any other suitable type of memory. The memory 815 is a non-transitory computer-readable medium. In some cases, the memory 815 can be a volatile memory device, while in other cases the memory can be a non-volatile memory device.

The storage device 825 can be a non-transitory computer-readable medium that provides large capacity storage for the computing system 805. The storage device 825 can be a disk drive, a flash drive, a solid state device, or some other type of storage device. In some cases, the storage device 825 can be a database that is remote from the computing system 805. The storage device can store operating system data, file data, database data, algorithms, and software modules, as examples. In the case of the computing system 202, the storage device can store algorithms embodying the operations of the methods described herein. The storage device can also store data related to pick jobs, communications with the autonomous vehicles 102, and the performance of the fulfillment management system.

Lastly, the input/output device 820 provides an interface to other devices, such as a touch screen interface, and other computing systems such as remote computing system 850. The input/output device 820 can provide signal transfer links for communications with other devices and computing systems. The signal transfer links can include wired and/or wireless signal transfer links that transmit and receive communications via known communication protocols. For instance, the signal transfer links can provide wireless links to the autonomous vehicles 102. In some instances, the input/output device 820 can include a wired or wireless network interface device.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain operations of the methods may be performed in a different order, may be performed in parallel, or may be omitted. Moreover, in alternate embodiments additional operations may be added to the example methods described herein. Accordingly, the example methods provided herein should be viewed as illustrative and not limiting of the disclosure.

Terms such as "first" and "second" are used merely to distinguish one element or operation from another. Such terms are not meant to denote a preference or a particular order, and are not meant to limit the embodiments described herein. In the example embodiments described herein, numerous specific details are set forth in order to provide a more thorough understanding of the disclosure. However, it will be apparent to one of ordinary skill in the art having regard to the present application that the embodiments may be practiced without these specific details. In other instances, well-known features have not been described in detail to avoid unnecessarily complicating the description.

As used herein, the terms "a," "an," and "the" are intended to include plural alternatives, e.g., at least one. The phrase "and/or" means either or both. Similarly, when used in a list of items, the word "or" means either or both. However, when "or" is preceded by "either" or similar terms, it shall be interpreted as meaning exclusive alternatives. The terms "including", "with", and "having", as used herein, are defined as comprising (i.e., open language), unless specified otherwise.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Although embodiments described herein are made with reference to example embodiments, it should be appreciated by those skilled in the art having regard to the present application that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A computer-implemented method of assigning pick jobs to autonomous vehicles, the method comprising:
    determining an estimated completion time for respective ones of a plurality of pick jobs based on first pick rate data for a first autonomous vehicle;
    performing a comparison of associated due dates of the respective ones of the plurality of pick jobs to the estimated completion time to identify an at-risk pick job, the at-risk pick job indicative of completion of a first job of the plurality of pick jobs after the associated due date for the first job;
    generating an order of completion of the at-risk pick job and remaining ones of the plurality of pick jobs;
    transmitting signals to the first autonomous vehicle to cause the first autonomous vehicle to execute the at-risk pick job based on the order of completion;
    revising the order of completion of the remaining ones of the plurality of pick jobs based on second pick rate data for the first autonomous vehicle, the second pick rate data associated with execution of the at-risk pick job; and
    transmitting signals to the first autonomous vehicle to cause the first autonomous vehicle to execute the remaining ones of the plurality of pick jobs based on the revised order of completion.

2. The method of claim 1, wherein the at-risk pick job is a first at-risk pick job and generating the order of completion includes ordering the first at-risk pick job and a second at-risk pick job primarily based on the associated date due of the first at-risk pick and an associated due date of the second at-risk pick job and secondarily to maximize overall efficiency of the execution of the first at-risk pick job and execution of the second at-risk pick job.

3. The method of claim 2, further including:
    determining that the estimated completion time of the first at-risk pick job exceeds the associated due date by a predetermined factor; and
    applying a ship date bias to the first at-risk pick job responsive to the estimated completion time exceeding the associated due date by the predetermined factor; and
    generating the order of completion of the first at-risk pick job and the second at-risk pick job based on the ship date bias.

4. The method of claim 1, wherein generating the order of completion includes ordering the remaining ones of the plurality of pick jobs for efficiency based on locations of items to be picked in the remaining ones of the plurality of pick jobs.

5. The method of claim 1, further including:
periodically determining a pick rate for a fulfillment center, wherein the pick rate for the fulfillment center is based at least in part on reference pick rate data, the fulfillment center including the first autonomous vehicle,
wherein determining the estimated completion time for respective ones of the plurality of pick jobs includes applying the pick rate for the fulfillment center to a schedule of pick jobs of the plurality of pick jobs.

6. The method of claim 5, further including selecting the pick rate for the fulfillment center from a schedule of pick rates, wherein each pick rate of the schedule of pick rates is associated with a time interval.

7. The method of claim 5, further including determining the pick rate for the fulfillment center based on one or more of:
a number of available workers;
a number of available ones of the autonomous vehicles, the autonomous vehicles including the first autonomous vehicle;
a buffer; or
a standard deviation for the reference pick rate data.

8. The method of claim 1, wherein performing the comparison of the associated due dates of the respective ones of the plurality of pick jobs to the estimated completion time for the respective ones of the plurality of pick jobs occurs at a defined interval.

9. The method of claim 1, wherein performing the comparison of the associated due dates of the respective ones of the plurality of pick jobs to the estimated completion time for the respective ones of the plurality of pick jobs occurs responsive to receiving new data for a fulfillment center.

10. The method of claim 1, wherein generating the order of completion includes:
ordering the at-risk pick job based primarily on the associated due date; and
ordering the remaining ones of the plurality of pick jobs to maximize overall efficiency of the execution of the remaining ones of the plurality of pick jobs.

11. The method of claim 1, further including:
placing the at-risk pick job in a priority work queue ordered primarily based on associated due dates for respective ones of a first collection of picks jobs in the priority work queue; and
assigning the remaining ones of the plurality of pick jobs to a second work queue ordered primarily to maximize overall efficiency of execution of respective ones of a second collection of pick jobs in the second work queue.

12. The method of claim 11, further including associating the at-risk pick job with a priority indicator.

13. The method of claim 11, wherein the priority work queue corresponds to a first in-memory data structure representing the first collection of pick jobs and the second work queue corresponds to a second in-memory data structure representing the second collection of pick jobs.

14. The method of claim 13, wherein at least one of the first in-memory data structure or the second in-memory data structure is a priority queue.

15. The method of claim 1, wherein generating the order of completion includes ordering the at-risk pick job and the remaining ones of the plurality of pick jobs based on an associated score, wherein the associated score is based on one or more of the following associated with the at-risk pick job and the remaining ones of the plurality of pick jobs:
a number of items;
a location of items; or
the associated due date.

16. A computing system for assigning pick jobs to autonomous vehicles, the computing system comprising:
a communication device to transmit signals to respective ones of the autonomous vehicles; and
a processor in communication with the communication device, the processor to:
determine an estimated completion time for respective ones of a plurality of pick jobs based on first pick rate data for a first autonomous vehicle;
perform a comparison of associated due dates of the respective ones of the plurality of pick jobs to the estimated completion time to identify an at-risk pick job, the at-risk pick job indicative of completion of a first job of the plurality of pick jobs after the associated due date for the first job;
generate an order of completion of the at-risk pick job and remaining ones of the plurality of pick jobs;
cause, via the signals transmitted to the first autonomous vehicle by the communication device, the first autonomous vehicle to execute the at-risk pick job based on the order of completion;
revise the order of completion of the remaining ones of the plurality of pick jobs based on second pick rate data for the first autonomous vehicle, the second pick rate data associated with execution of the at-risk pick job; and
cause, via the signals transmitted to the first autonomous vehicle by the communication device, the first autonomous vehicle to execute the remaining ones of the plurality of pick jobs based on the revised order of completion.

17. The computing system of claim 16, wherein the at-risk pick job is a first at-risk pick job and the processor is to generate the order of completion by ordering the first at-risk pick job and a second at-risk pick job primarily based on the associated due date of the first at-risk pick job and an associated due date of the second at-risk pick job and secondarily to maximize overall efficiency of the execution of the first at-risk pick job and execution of the second at-risk pick job.

18. The computing system of claim 17, wherein the processor is to:
determine that the estimated completion time of the first at-risk pick job exceeds the associated due date by a predetermined factor; and
apply a ship date bias to the first at-risk pick job responsive to the estimated completion time exceeding the associated due date by the predetermined factor; and
generate the order of completion of the first at-risk pick job and the second at-risk pick job based on the ship date bias.

19. The computing system of claim 16, wherein the processor is to generate the order of completion by ordering the remaining ones of the plurality of pick jobs for efficiency based on locations of items to be picked in the remaining ones of the plurality of pick jobs.

20. The computing system of claim 16, wherein the processor is to:
periodically determine a pick rate for a fulfillment center, wherein the pick rate for the fulfillment center is based at least in part on reference pick rate data, the fulfillment center including the first autonomous vehicle; and determine the estimated completion time for the respective ones of the plurality of pick jobs by applying the pick rate for the fulfillment center to a schedule of pick jobs of the plurality of pick jobs.

21. The computing system of claim 20, wherein the processor is to select the pick rate for the fulfillment center from a schedule of pick rates, wherein each pick rate of the schedule of pick rates is associated with a time interval.

22. The computing system of claim 20, wherein the processor is to determine the pick rate for the fulfillment center based on one or more of:
   a number of available workers;
   a number of available autonomous vehicles including the first autonomous vehicle;
   a buffer; or
   a standard deviation for the reference pick rate data.

23. The computing system of claim 16, wherein the processor is to:
   place the at-risk pick job in a priority work queue ordered primarily based on associated due dates for respective ones of a first collection of picks jobs in the priority work queue; and
   assign the remaining ones of the plurality of pick jobs to a second work queue ordered primarily to maximize overall efficiency of execution of respective ones of a second collection of pick jobs in the second work queue.

24. The computing system of claim 23, wherein the priority work queue corresponds to a first in-memory data structure representing the first collection of pick jobs and the second work queue corresponds to a second in-memory data structure representing the second collection of pick jobs.

25. A non-transitory computer-readable medium comprising instructions stored thereon that cause one or more processors to:
   determine an estimated completion time for respective ones of a plurality of pick jobs based on first pick rate data for a first autonomous vehicle;
   perform a comparison of associated due dates of the respective ones of the plurality of pick jobs to the estimated completion time to identify an at-risk pick job, the at-risk pick job indicative of completion of a first job of the plurality of pick jobs after the associated due date for the first job;
   generate an order of completion of the at-risk pick job and remaining ones of the plurality of pick jobs;
   transmit signals to the first autonomous vehicle to cause the first autonomous vehicle to execute the at-risk pick job based on the order of completion;
   revise the order of completion of the remaining ones of the plurality of pick jobs based on second pick rate data for the first autonomous vehicle, the second pick rate data associated with execution of the at-risk pick job; and
   transmit signals to the first autonomous vehicle to cause the first autonomous vehicle to execute the remaining ones of the plurality of pick jobs based on the revised order of completion.

* * * * *